US011714623B2

(12) United States Patent
Gosar et al.

(10) Patent No.: US 11,714,623 B2
(45) Date of Patent: *Aug. 1, 2023

(54) SYSTEMS AND METHODS TO CONFIGURE CUSTOMER-SPECIFIC DEPLOYMENTS OF SETS OF ENTERPRISE SOFTWARE APPLICATIONS

(71) Applicant: INSTABASE, INC., Dover, DE (US)

(72) Inventors: Kunal Gosar, New York, NY (US); Shaunak Godbole, San Francisco, CA (US)

(73) Assignee: Instabase, Inc., Dover, DE (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/514,756

(22) Filed: Oct. 29, 2021

(65) Prior Publication Data

US 2023/0011766 A1 Jan. 12, 2023

Related U.S. Application Data

(63) Continuation of application No. 17/369,355, filed on Jul. 7, 2021, now Pat. No. 11,188,318.

(51) Int. Cl.
| | |
|---|---|
| *H04L 67/01* | (2022.01) |
| *H04L 67/1097* | (2022.01) |
| *G06F 9/445* | (2018.01) |
| *G06F 9/455* | (2018.01) |
| *G06F 8/60* | (2018.01) |
| *G06F 9/50* | (2006.01) |
| *G06F 16/21* | (2019.01) |

(Continued)

(52) U.S. Cl.
CPC ............... *G06F 8/60* (2013.01); *G06F 9/451* (2018.02); *G06F 9/5005* (2013.01); *G06F 16/21* (2019.01); *H04L 67/34* (2013.01)

(58) Field of Classification Search
CPC ............ G06F 8/60; G06F 9/451; G06F 16/21; G06F 9/5005; H04L 67/34
See application file for complete search history.

(56) References Cited

U.S. PATENT DOCUMENTS 10,776,178 B2 * 9/2020 Hargrove .............. G06F 40/186
11,018,931 B2 5/2021 Stillman
(Continued)

OTHER PUBLICATIONS

Tiwary et al., Introducing Network Multi-Tenancy for Cloud-Based Enterprise Resource Planning: An IoT Application, 7 pages (Year: 2018).*

*Primary Examiner* — Thuy Dao
(74) *Attorney, Agent, or Firm* — Esplin & Associates, PC

(57) ABSTRACT

Systems and methods for configuring deployments of sets of enterprise software applications to users are disclosed. Exemplary implementations may: store information, including executable code for a set of enterprise software applications and a configuration database including deployment-specific configuration settings and corresponding setting values; effectuate deployment of the set of enterprise software applications on a first deployment server; present an administrative user interface to an administrative user; generate a first modification database with user-provided configuration settings in accordance with user input received through the administrative user interface; and modify the configuration settings of the first deployment server based on the first modification database.

20 Claims, 5 Drawing Sheets

(51) Int. Cl.
H04L 67/00 (2022.01)
G06F 9/451 (2018.01)

(56) References Cited

U.S. PATENT DOCUMENTS

| | | |
|---|---|---|
| 11,265,365 B2 * | 3/2022 | Hargrove ................ H04W 4/18 |
| 2007/0276948 A1 | 11/2007 | Burdett |
| 2011/0145789 A1 | 6/2011 | Rasch |
| 2014/0040473 A1 | 2/2014 | Ricky |
| 2018/0006883 A1 | 1/2018 | Melliere |
| 2019/0303118 A1 | 10/2019 | Avinash Dorle |

* cited by examiner

SYSTEMS AND METHODS TO CONFIGURE CUSTOMER-SPECIFIC DEPLOYMENTS OF SETS OF ENTERPRISE SOFTWARE APPLICATIONS

FIELD OF THE DISCLOSURE

The present disclosure relates to systems and methods to configure deployments of sets of enterprise software applications to users.

BACKGROUND

Distributing consumer software is known. Manually distributing or deploying suites or sets of software applications is known. Manually updating a deployment of a set of software applications is known, and both error prone and inefficient.

SUMMARY

One aspect of the present disclosure relates to a system for configuring deployments of sets of enterprise software applications to users. A set of enterprise software applications is configured to be executed on client computing platforms that are associated with the users. The system may include electronic storage, one or more hardware processors configured by machine-readable instructions, a first deployment server, and/or other components. The electronic storage may be configured to store information for the set of enterprise software applications, the set of enterprise software applications including at least a first software application, a second software application, and a third software application. The information may include (i) executable code of the set of enterprise software applications, and (ii) a configuration database that may include a set of deployment-specific configuration settings and corresponding setting values that define a deployment on the first deployment server of the set of enterprise software applications. The set of deployment-specific configuration settings may include one or more of (a) connection parameters to control connections between the configuration database and the set of enterprise software applications, (b) environment variables, and (c) resource parameters to control available computational resources and available storage resources.

The system may be configured to effectuate the deployment of the set of enterprise software applications on the first deployment server in accordance with the set of deployment-specific configuration settings and the corresponding setting values. Subsequent to the deployment, the first deployment server is accessible by the client computing platforms associated with the users. Subsequent to the deployment, the first deployment server is configured such that the client computing platforms execute the set of enterprise software applications through the first deployment server. The system may be configured to effectuate a presentation of an administrative user interface to an administrative user. The administrative user interface may be configured to receive user input from the administrative user. The administrative user interface may enable, through the user input, the administrative user to (i) select and/or enter one or more user-provided deployment-specific configuration settings and one or more corresponding user-provided setting values, and (ii) confirm a user-initiated modification of the deployment of the set of software applications on the first deployment server in accordance with the one or more user-provided deployment-specific configuration settings and the one or more corresponding user-provided setting values as entered and/or selected through the administrative user interface. The system may be configured to generate a first modification database, which may include one or more modification-specific configuration settings and one or more corresponding setting values, based on the one or more user-provided deployment-specific configuration settings and the one or more corresponding user-provided setting values. The system may be configured to modify, based on the first modification database, the deployment of the set of software applications on the first deployment server by modifying individual ones of the set of deployment-specific configuration settings that match individual ones of the one or more modification-specific settings to individual ones of the one or more corresponding setting values. Modifications of the individual ones of the set of deployment-specific configuration settings are made while the deployment on the first deployment server continues to be accessible by the client computing platforms.

Another aspect of the present disclosure related to a method of configuring deployments of sets of enterprise software applications to users, wherein a set of enterprise software applications is executed on client computing platforms that are associated with the users. The method may include storing information for the set of enterprise software applications, the set of enterprise software applications including at least a first software application, a second software application, and a third software application. The information may include (i) executable code of the set of enterprise software applications, and (ii) a configuration database that may include a set of deployment-specific configuration settings and corresponding setting values that define a deployment on a first deployment server of the set of enterprise software applications. The set of deployment-specific configuration settings may include one or more of (a) connection parameters to control connections between the configuration database and the set of enterprise software applications, (b) environment variables, and (c) resource parameters to control available computational resources and available storage resources.

The method may include effectuating the deployment of the set of enterprise software applications on the first deployment server in accordance with the set of deployment-specific configuration settings and the corresponding setting values. Subsequent to the deployment, the first deployment server is accessible by the client computing platforms associated with the users. The first deployment server is configured, subsequent to the deployment, such that to the client computing platforms execute the set of enterprise software applications through the first deployment server. The method may include effectuating a presentation of an administrative user interface to an administrative user. The administrative user interface may be configured to receive user input from the administrative user. The administrative user interface may enable, through the user input, the administrative user to (i) select and/or enter one or more user-provided deployment-specific configuration settings and one or more corresponding user-provided setting values, and (ii) confirm a user-initiated modification of the deployment of the set of software applications on the first deployment server in accordance with the one or more user-provided deployment-specific configuration settings and the one or more corresponding user-provided setting values as entered and/or selected through the administrative user interface. The method may include generating a first modification database, which may include one or more modification-specific configuration settings and one or more corresponding setting values, based on the one or more user-provided deployment-specific configuration settings and the one or more corresponding user-provided setting values. The method may include modifying, based on the first modification database, the deployment of the set of software applications on the first deployment server by modifying individual ones of the set of deployment-specific configuration settings that match individual ones of the one or more modification-specific settings to individual ones of the one or more corresponding setting values. Modifications of the individual ones of the set of deployment-specific configuration settings are made while the deployment on the first deployment server continues to be accessible by the client computing platforms.

As used herein, any association (or relation, or reflection, or indication, or correspondency) involving servers, processors, client computing platforms, software applications, deployments, databases, modifications, settings, setting values, pipelines, versions, steps, tasks, selections, determinations, comparisons, analyses, improvements, reductions, presentations, notifications, user interfaces, user interface elements, portions, fields, character sequences, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
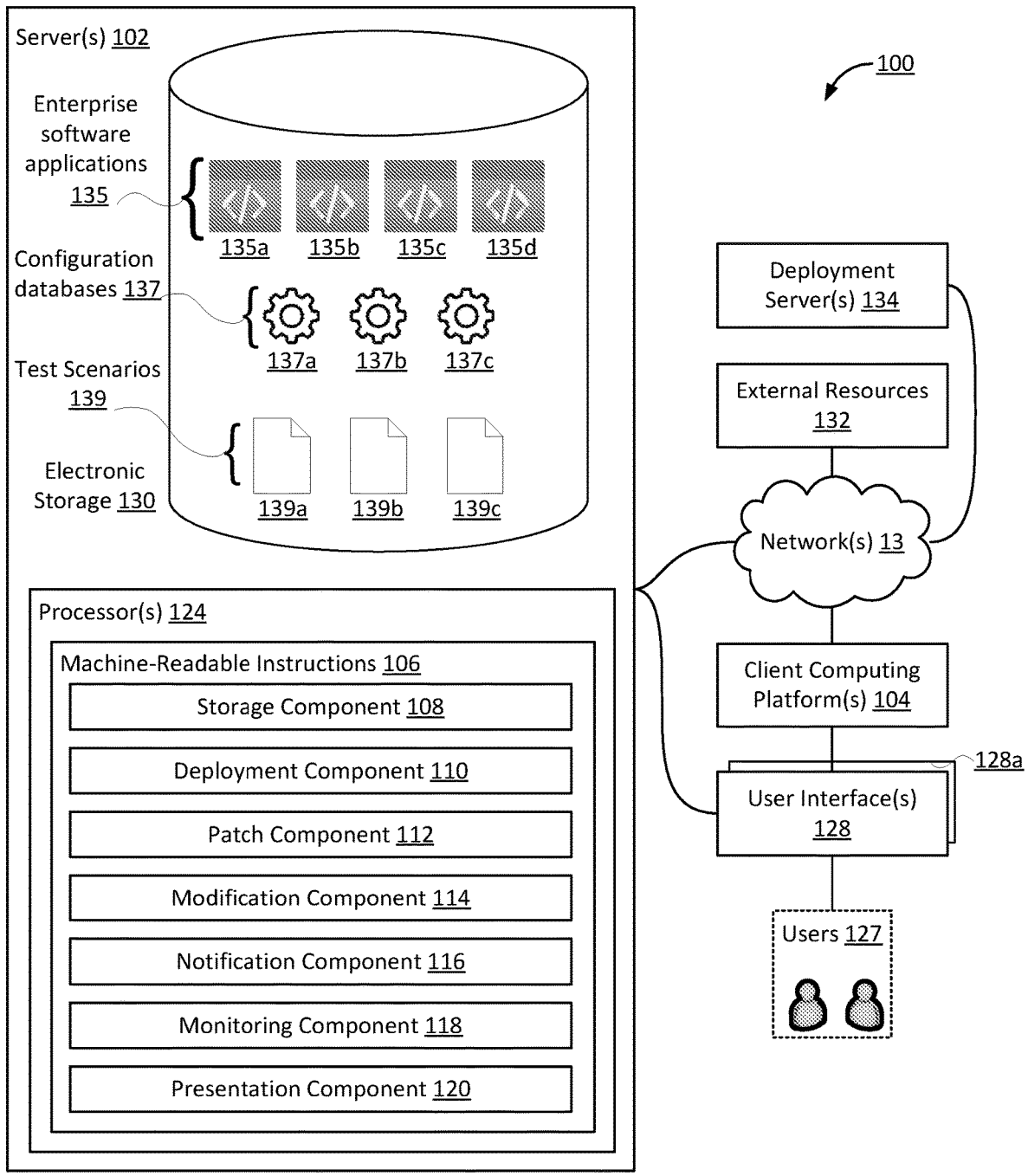
FIG. 1 illustrates a system for configuring deployments of sets of enterprise software applications to users, in accordance with one or more implementations.

FIG. 1 illustrates a system 100 for configuring deployments of sets of enterprise software applications 135 to users. For consumer software, an individual installation of a specific version of a software application, installed on one or more particular computing devices, may be common, but this model and/or mechanism of distribution and/or installation may not work well, or may not be adequate and/or flexible enough for sets of enterprise software applications 135. Enterprise software applications 135 may be distributed among enterprises, corporate clients, and/or other groups of employees or other people interacting and/or working together. As used herein, a corporate client may refer to a group of people working together and/or sharing some responsibilities and/or goals as a group. For example, a corporate client may refer to a corporation, a company, a business, an enterprise, a government entity, a partnership, an organization, and/or another group of people working together and/or sharing some responsibilities and/or goals as a group. In some implementations, a corporate client may include and/or form a legal entity, or be associated with a legal entity.

As used herein, an instance of an enterprise software application may be referred to as an enterprise software application (or software application). Enterprise software applications 135 may include executable code of (machine-readable) instructions that form a program. In some implementations, executable code and/or instructions may be executed by a processor to perform one or more particular features, tasks, and/or functionality. As used here, a processor is a machine and not a person. In some implementations, execution by a processor may include execution by a machine that is assisted, helped, controlled, managed, and/or otherwise jointly operated by a person. Enterprise software applications 135 may include a first software application 135a, a second software application 135b, a third software application 135c, a fourth software application 135d, and so forth. In some implementations, multiple enterprise software applications may be interconnected and/or otherwise combined to form more elaborate software applications or perform more elaborate functions than the individual software applications. For example, in some implementations, multiple software applications may be combined to form one or more pipelines of software applications. For example, in a software pipeline, the output and/or result produced and/or generated by first software application 135a may subsequently be used as input and/or source for second software application 135b. For example, the output and/or result produced and/or generated by second software application 135b may subsequently be used as input and/or source for third software application 135c, and so forth.

Referring to FIG. 1, in some implementations, system 100 may include one or more servers 102, deployment server(s)

134, client computing platform(s) 104, user interface(s) 128, and/or external resources 132. Server(s) 102 may be configured to communicate with one or more client computing platforms 104 or deployment servers 134 according to a client/server architecture and/or other architectures. Client computing platform(s) 104 may be configured to communicate with other client computing platforms via server(s) 102 and/or according to a peer-to-peer architecture and/or other architectures. In some implementations, users 127 may access system 100 via client computing platform(s) 104 and/or user interface(s) 128. In some implementations, users 127 may access system 100 via user interfaces 128. Users 127 may include a first user, a second user, a third user, a fourth user, and/or other users. One or more of users 127 may be administrative users, such as a first administrative user, a second administrative user, a third administrative user, and so forth. An administrative user may deploy a particular set of enterprise software applications 135 (also referred to as a "suite") on one or more deployment servers 134. By virtue of the systems and methods described in this disclosure, the administrative user may configure such a deployment, modify the configuration of a deployment, and/or perform other tasks related to the use of a deployment or a deployment server 134.

In some implementations, one or more sets of users may be organized under one or more corporate clients. For example, a first set of users may be organized under a first corporate client, e.g., as the employees of the first corporate client. In some implementations, one or more sets of users may be organized under one or more organizational subdivisions of an individual corporate client. For example, a second set of users may be organized under a first subdivision of the first corporate client. As used herein, organizational subdivisions may be (based on) groups of employees (e.g., a research group, or the junior associates), departments (e.g., a compliance department), locations (e.g., the San Diego office), and/or other entities within corporate clients or legal entities. In some implementations, an administrative user may be associated with one or more corporate clients and/or one or more organizational subdivisions of a corporate client. In some implementations, a particular deployment of a suite may be specific to a particular corporate client, a particular organization subdivision of an individual corporate client, or to a group of people.

In some implementations, individual ones of users 127 may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a storage component 108, a deployment component 110, a patch component 112, a modification component 114, a notification component 116, a monitoring component 118, a presentation component 120, and/or other instruction components.

Storage component 108 may be configured to electronically store information. In some implementations, storage component 108 may be configured to electronically store information in electronic storage 130. Stored information may include one or more sets of software applications 135, including but not limited to a particular set of enterprise software applications 135. Stored information may include executable code of software applications. Stored information may include binary code to install software applications. Stored information may include executable code to install software applications. Stored information may include installed software applications that are executable by users 127. By way of non-limiting example, the software applications may include one or more of first software application 135a, second software application 135b, third software application 135c, fourth software application 135d, and so forth. In some implementations, the software applications may be organized in different sets and/or subsets, which may in some cases overlap, and in some cases be mutually exclusive. In some implementations, particular sets of interconnected individual software applications may form software pipelines. In some implementations, sets of interoperating individual software applications may form software pipelines.

In some implementations, the stored information may include one or more configuration databases 137, including but not limited to a particular configuration database 137a. Configuration database 137a may include a set of deployment-specific configuration settings and corresponding setting values that define a deployment on a particular deployment server 134 of set of enterprise software applications 135. As used herein, the term "deployment-specific" may refer to a particular deployment (of software applications) on one or more particular deployment servers 134.

The set of deployment-specific configuration settings include one or more of (a) connection parameters to control connections between configuration database 137a, set of enterprise software applications 135, and/or particular deployment server 134, (b) environment variables, (c) resource parameters to control available computational resources and available storage resources, (d) one or more infrastructure parameters that control one or more of a filesystem, one or more databases, and a cluster of particular deployment server 134, and/or other deployment-specific configuration settings. In some implementations, the set of deployment-specific configuration settings includes one or more parameters that control individual software applications (e.g., which version is currently the default version, or which version is to be used in a particular type of software pipeline) and/or individual software pipelines (e.g., which particular versions of software applications to include or combine in a particular software pipeline). In some implementations, the set of deployment-specific configuration settings includes one or more parameters that control a Kubernetes-based platform (not depicted in FIG. 1), or other container orchestration platforms. By way of non-limiting example, one or more of these parameters may be related to mounting a file system onto a Kubernetes cluster, e.g., through a volumeMount configuration block. Kubernetes supports different types of volumes for storage, including but not limited to ephemeral volumes, persistent volumes, and/or other types of volumes. By way of non-limiting example, one or more of these parameters may be related to CPU or memory allocation to a container running in a particular Kubernetes cluster, or to the number of replicas of a particular container to run in the particular Kubernetes cluster.

In some implementations, the stored information may include one or more test scenarios 139, including but not limited to one or more of a first test scenario 139a, a second test scenario 139b, a third test scenario 139c, and/or other test scenarios. An individual test scenario 139 may include different types of operations of a particular deployment on a particular deployment server 134 of set of enterprise software applications 135. By way of non-limiting example, individual test scenarios 139 may be used and/or otherwise executed (e.g., by monitoring component 118) to monitor and/or quantify operations of the particular deployment on the particular deployment server 134.

Deployment component 110 may be configured to effectuate the deployment of set of enterprise software applications 135 on one or more deployment servers 134 (e.g., on a first deployment server 134). In some implementations, deployment component 110 may deploy set of enterprise software applications 135 on a particular deployment server 134. In some implementations, deployment may include storing and/or installing software applications such that users can access and/or execute the software applications on their client computing platforms 104 (in other words, the particular deployment server 134 is accessible by client computing platforms 104 that are associated with the users). Deployment may include installing, setting up, and/or configuring the particular deployment server 134 such that client computing platforms 104 execute the software applications through the particular deployment server 134 (e.g., the front-end and/or user interaction for a particular software application may be executed on a client computing platform 104, while the back-end and/or resource-intensive operations (e.g., in terms of one or more of memory or storage usage, computation, bandwidth, file handles, network sockets, etc.) may be executed on the particular deployment server 134). The users may interact with the software applications through user interfaces 128 associated with client computing platforms 104. Deployment by deployment component 110 may be based on a set of deployment-specific configuration settings and corresponding setting values, e.g., as included in configuration database 137a. A particular deployment on particular deployment server 134 may be in accordance with the set of deployment-specific configuration settings and corresponding setting values that are included in configuration database 137a. In some implementations, the configuration settings that control operation of a particular deployment are part of that deployment, and may be not only included in the deployment, but accessible and modifiable as well.

Figure 4:
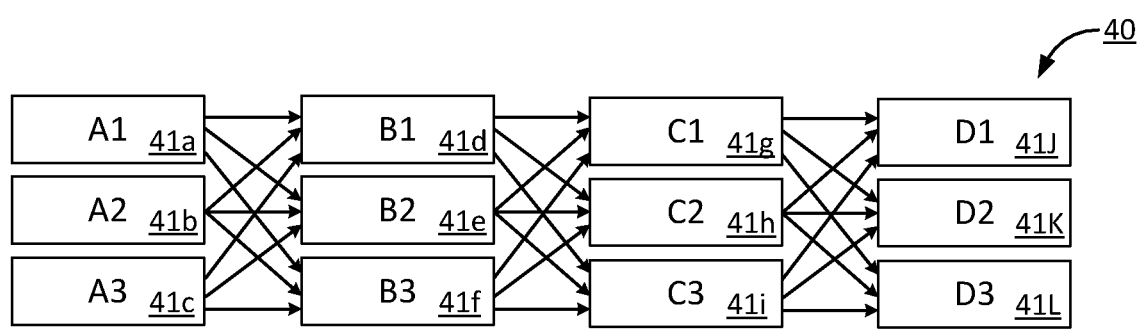
FIG. 4 illustrates exemplary software pipelines including multiple software applications, as may be used in a system for configuring deployments of sets of enterprise software applications, in accordance with one or more implementations.

Note that set of enterprise software applications 135 may include multiple versions of the same software application. By way of non-limiting example, FIG. 4 depicts multiple exemplary software pipelines 40 including multiple software applications, as may be used by system 100. As depicted, software pipelines 40 include software applications 41a, 41b, 41c, 41d, 41e, 41f, 41g, 41h, 41i, 41J, 41K, and 41L, labeled "A1", "A2", "A3", "B1", "B2", "B3", "C1", "C2", "C3", "D1", "D2", and "D3" as shown, respectively. Software application 41a (labeled "A1"), software application 41b (labeled "A2"), and software application 41c (labeled "A3") may be different versions of the same software application, such that A1 is the oldest version, A2 is newer than A1, and A3 is newer than A2. Similarly, software applications 41d, 41e, 41f may be different versions of a different software application, software applications 41g, 41h, 41i may be different versions of yet another software application, and software applications 41J, 41K, 41L may be different versions of a fourth software application. Accordingly, FIG. 4 may depict 81 distinct software pipelines (or possible software pipelines). In some implementations, a set of software pipelines as depicted may be included in the same stored executable code, so that all distinct software pipelines are available at the same time, to multiple users, without requiring installations or re-installations of any software applications. In some implementations, a single deployment of the stored executable code supports execution of all distinct software pipelines at the same time. For example, the same user may launch different pipelines at the same time (say, a first software pipeline and a second software pipeline) such that output generated by each of the different pipelines is presented to the same user at the same time.

Presentation component 120 may be configured to present user interfaces 128 to users 127, through their client computing platforms 104. For example, presentation component 120 may be configured to effectuate a presentation of an administrative user interface 128a to an administrative user. For example, the administrative user may make (or rather, cause system 100 to make) modifications to a particular deployment of set of software applications 135 on particular deployment server 134. In some implementations, users 127 may access and/or otherwise use set of enterprise software applications 135 through users interfaces 128. For example, a particular deployment server 134 may be accessible by client computing platforms 104 through a particular URL. In some implementations, all or most of a particular software application may be executed on client computing platforms 104 (including, at least, the front-end). In some implementations, all or most of a particular software application may be executed on particular deployment server 134 (including, at least, the back-end). Users 127 may interact with set of enterprise software applications 135 through users interfaces 128.

In some implementations, presentation component 120 may be configured to present information to users 127. In some implementations, presented information may be determined by monitoring component 118 and/or otherwise be derived from operations of monitoring component 118. Presented information may include output generated by software applications and/or software pipelines. In some implementations, information may be presented on client computing platforms 104. In some implementations, information may be presented through user interfaces 128. In some implementations, output generated by a first software pipeline may be presented to a first user at the same time that output generated by a second software pipeline (which may be different from the first software pipeline) is presented to a second user.

Referring to FIG. 1, patch component 112 may be configured to obtain and/or otherwise retrieve one or more databases, including but not limited to configuration databases, modification databases, and/or other databases. In some implementations, patch component 112 may be configured to generate one or more databases, including but not limited to configuration databases, modification databases, and/or other databases. As used herein, a modification database may be referred to as a patch or as a "configuration-modification database". For example, as depicted in FIG. 1, configuration databases 137 may include, by way of non-limiting example, a first modification database 137b, a second modification database 137c, and/or other configuration databases. In some implementations, patch component 112 may obtain multiple modification databases (e.g., first modification database 137b and second modification database 137c). In some implementations, patch component 112 may generate a particular modification database (e.g., based on one or more user-provided deployment-specific configuration settings and one or more corresponding user-provided setting values, e.g., as entered and/or selected through administrative user interface 128a).

In some implementations, patch component 112 may generate a particular system-initiated modification database (e.g., including one or more system-initiated deployment-specific configuration settings and one or more corresponding system-initiated setting values, e.g., as may be based on a particular modification of a particular deployment of set of software applications 135 on a particular deployment server 134 that is likely to improve one or more particular monitored and quantified operations, e.g., as monitored and/or quantified through monitoring component 118). Individual modification databases include one or more modification-specific configuration settings and one or more corresponding setting values. In some implementations, multiple modification databases may be organized in a particular order. For example, according to the particular order, first modification database 137b may be ahead of second modification database 137c (e.g., for modifications by modification component 114).

Modification component 114 may be configured to modify deployments of sets of software applications, including but not limited to set of enterprise software applications 135. In some implementations, modification component 144 may modify one or more deployment servers 134 (e.g., a particular deployment server 134). For example, modification component 114 may add a deployment-specific configuration setting (and set it to a corresponding setting value) that was previously unknown and/or otherwise not set or used for a particular deployment. For example, modification component 114 may modify a deployment-specific configuration setting that was previously set and/or otherwise used by deployment component 110 for a particular deployment. By way of non-limiting example, assume a particular deployment (as deployed by deployment component 110) uses (i) a first connection parameter that controls connections between set of enterprise software applications 135 and particular deployment server 134, (ii) a first environment variable for using cloud-based services, (iii) a first resource parameter that controls storage resources available to set of enterprise software applications 135, and (iv) a first infrastructure parameter that controls a particular filesystem available to set of enterprise software applications 135. In some implementations, modification component 114 may modify one or more of these four parameters and/or variables for the particular deployment. In some implementations, modification component 114 may modify all of these four parameters and/or variables for the particular deployment. In some implementations, modification component 114 may modify a particular deployment based on a particular modification database that is generated by patch component 112, e.g., based on one or more user-provided deployment-specific configuration settings and one or more corresponding user-provided setting values (here, these may be provided by an administrative user).

Modification component 114 may be configured to use individual ones of multiple modification databases according to a particular order, i.e., the particular order in which the multiple modification databases are organized as described in relation to patch component 112. For example, modification component may modify a deployment (e.g., as deployed by deployment component 110) based on configuration database 137a by first making modifications based on first modification database 137b, followed by making modifications based on second modification database 137c. The particular order of the multiple modifications databases may be maintained by modification component 114. For example, assume configuration database 137a includes a first environment variable for using cloud-based services, which is set according to its corresponding setting value (e.g., a first Uniform Resource Locator or URL) to link to a first particular cloud-based server. Assume first modification database 137b includes the same first environment variable for using cloud-based services, but with a second setting value of a second URL. Assume second modification database 137c includes the same first environment variable for using cloud-based services, but with a third setting value of a third URL. By making modifications in the particular order as described, the first environment variable will be set to the third URL after these available modifications are finalized. In some implementations, modifications by modification component 114 may be made according to the particular order such that individual modification-specific configuration settings included in first modification database 137b are modified ahead of individual modification-specific configuration settings included in second modification database 137c.

In some implementations, a new deployment-specific configuration setting in a modification database (e.g., in first modification database 137b) may be added to a deployment. By modifying or adding deployment-specific configuration settings, modification component 114 may create (the state of) a new configuration database that controls and/or defines the current configuration of a particular deployment on particular deployment server 134 (i.e., this controls the operations of the particular deployment). In other words, modification component 114 creates the state of the current configuration of a particular deployment on particular deployment server 134. This new configuration database or this state may be referred to as the "materialized configuration table" or the "final state of the control plane".

In some implementations, modifications by modification component 114 may be made such that the particular deployment on the particular deployment server 134 continues to be accessible by client computing platforms 104. In some implementations, modifications by modification component 114 may be made without taking down the deployment or redeploying set of enterprise software applications 135 on the particular deployment server 134. Alternatively, and/or simultaneously, modifications by modification component 114 may be made without restarting, resetting, or rebooting the particular deployment server 134. In some cases, only affected software applications may need to be restarted.

In some implementations, modification component 114 may be configured to allow the most recent modification of a particular deployment-specific configuration setting to be undone, or "rolled-back". For example, modification component 114 may modify the same first environment variable for using cloud-based services (as described above) through a third modification database, and undo the most recent change. Accordingly, the first environment variable will be set to the second URL after the modifications included in the third modification database are finalized. This mechanism may be referred to as "preserving" a rollback for the first environment variable.

Notification component 116 may be configured to generate, transfer, and/or present notifications to users 127. For example, notification component 116 may present a notification (or otherwise notify) an administrative user regarding a particular deployment on a particular deployment server 134. For example, notification component 116 may present a notification (or otherwise notify) an administrative user regarding modifications of a particular deployment based on one or more modification databases. For example, notification component 116 may present a notification (or otherwise notify) an administrative user regarding a particular modification of a particular deployment that is likely to improve one or more particular monitored and/or quantified operations (e.g., operations that are monitored and/or quantified by monitoring component 118). In some implementations, notifications may be triggered by and/or based on operations of other components of system 100, including but not limited to monitoring component 118.

Monitoring component 118 may be configured to monitor deployment servers 134, e.g., while being used by users 127. Monitoring component 118 may monitor usage of a particular deployment, including but not limited to rates of usage of different resources, such as memory, storage, computation, bandwidth, file handles, network sockets, etc. In some implementations, monitoring component 118 may determine whether a particular usage (or rate of usage) is outside of a preferred range for a particular resource. Monitoring component may be configured to monitor and/or quantify operations of a particular deployment. By way of non-limiting example, operations may include one or more of a first type of operations controlled by connection parameters that control connections between a particular configuration database and set of enterprise software applications 135, a second type of operations controlled by environment variables, a third type of operations controlled by resource parameters that control at least one of available computational resources and available storage resources, and/or other types of operations. In some implementations, monitoring component 118 may be configured to assess whether a particular modification of the particular deployment is likely to improve one or more (types of) operations, e.g., based on one or more monitored and/or quantified operations. In some implementations, monitoring component 118 may be configured to use one or more test scenarios 139. By way of non-limiting example, a particular modification may pertain to one or more of memory or storage usage, computation, bandwidth, file handles, network sockets, etc. For example, in some implementations, a modification may pertain to the number of replicas of a particular container to run in a particular Kubernetes cluster.

For example, first test scenario 139*a* may describe and/or define activities and/or operations on a particular deployment that test or stress one or more connections between a particular configuration database and set of enterprise software applications 135. By monitoring and quantifying the performance of the particular deployment while using first test scenario 139*a*, monitoring component 118 may assess whether a particular modification (e.g., of one or more connection parameters) is likely to improve the performance (e.g., improve a particular performance characteristic, reduce a particular performance bottleneck, etc.).

For example, second test scenario 139*b* may describe and/or define activities and/or operations on a particular deployment that test or stress at least one of available computational resources and available storage resources in a particular deployment. By monitoring and quantifying the performance of the particular deployment while using second test scenario 139*b*, monitoring component 118 may assess whether a particular modification (e.g., of one or more resource parameters) is likely to improve the performance.

For example, third test scenario 139*c* may describe and/or define activities and/or operations on a particular deployment that test or stress at least one of a filesystem, one or more databases, a cluster of particular deployment server 134, and other deployment-specific configuration settings in a particular deployment. By monitoring and quantifying the performance of the particular deployment while using third test scenario 139*c*, monitoring component 118 may assess whether a particular modification (e.g., of one or more infrastructure parameters) is likely to improve the performance. In some implementations, determinations and/or assessments by monitoring component 118 may trigger and/or otherwise form the basis for a notification by notification component 116. In some implementations, determinations and/or assessments by monitoring component 118 may trigger and/or otherwise form the basis for generating a system-initiated modification database, e.g., by patch component 112.

Figure 5:
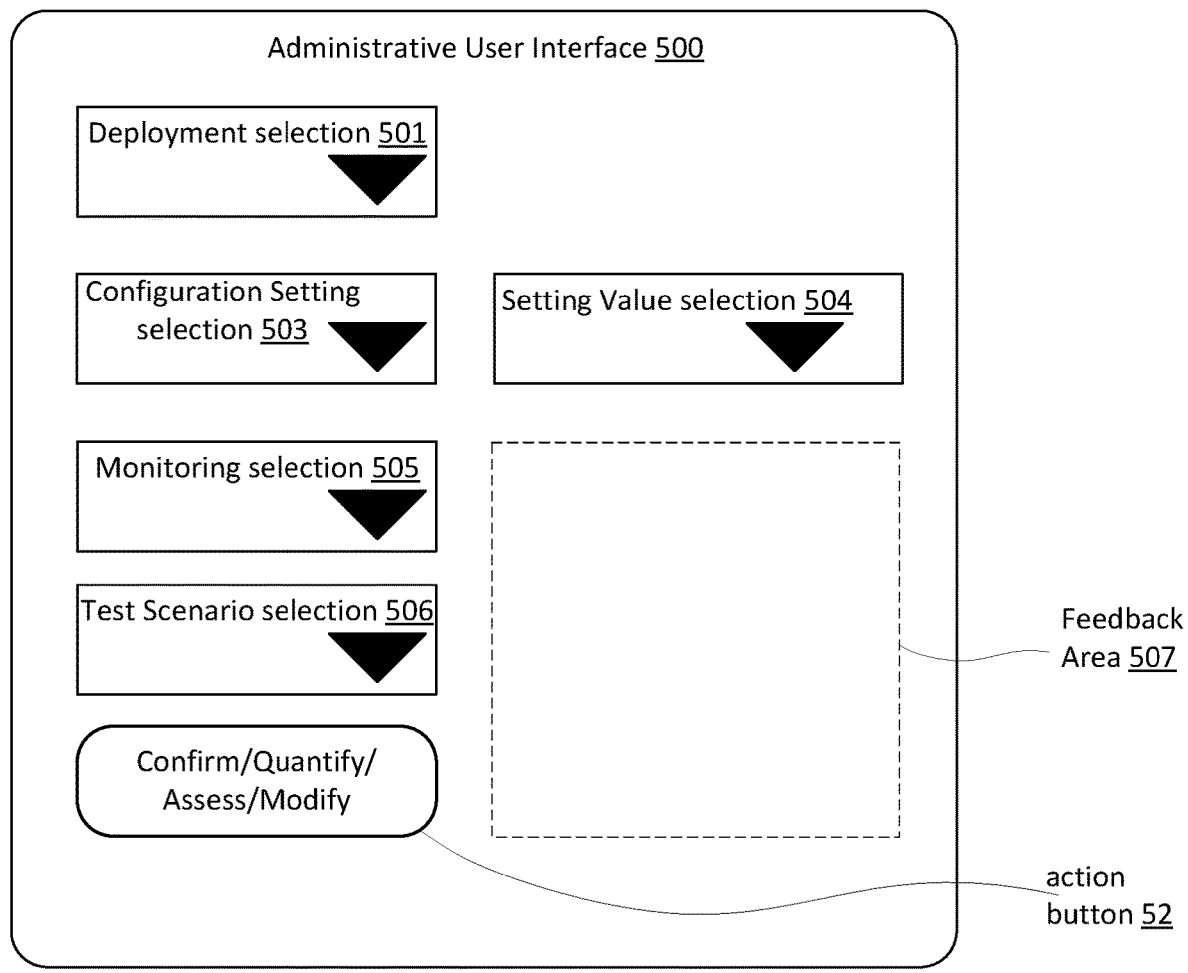
FIG. 5 illustrates an exemplary user interface, as may be used in a system for configuring deployments of sets of enterprise software applications, in accordance with one or more implementations.

FIG. 5 illustrates an example implementation of an administrative user interface 500 as may be used by system 100, in accordance with one or more implementations. Administrative user interface 500 may enable a particular user (e.g., an administrative user) to configure and modify deployments of sets of enterprise software applications. Administrative user interface 500 may include sections or fields for deployment selection 501, configuration setting selection 503, setting value selection 504, monitoring selection 505, test scenario selection 506, feedback area selection 507, and/or other graphical user interface elements. Deployment selection 501 may enable the administrative user to enter and/or select a particular deployment of a set of enterprise software applications (e.g., through one or more text fields or one or more dropdown menus, as indicated by the filled-in triangle). Configuration setting selection 503 may enable the administrative user to enter and/or select a particular (user-provided) deployment-specific configuration setting. Setting value selection 504 may enable the administrative user to enter and/or select a particular (user-provided) setting value, that corresponds to configuration setting selection 503. Monitoring selection 505 may enable the administrative user to enter and/or select a particular operation (or a particular performance characteristic) of the particular deployment to monitor, quantify, and/or assess. Test scenario selection 506 may enable the administrative user to enter and/or select a particular test scenario to be used and/or otherwise executed. Feedback area selection 507 may be used to provide information to the administrative user, e.g., regarding a particular deployment, a particular determination, a particular assessment, a particular test scenario, a particular recommendation, etc.

Administrative user interface 500 as depicted may further include graphical user interface elements such as, by way of non-limiting example, an action button 52 (which may enable the administrative use to confirm a particular action, quantify a particular operation or performance, make an assessment, and/or modify a deployment in accordance with the selections made by the administrative user in administrative user interface 500).

Figure 3A:
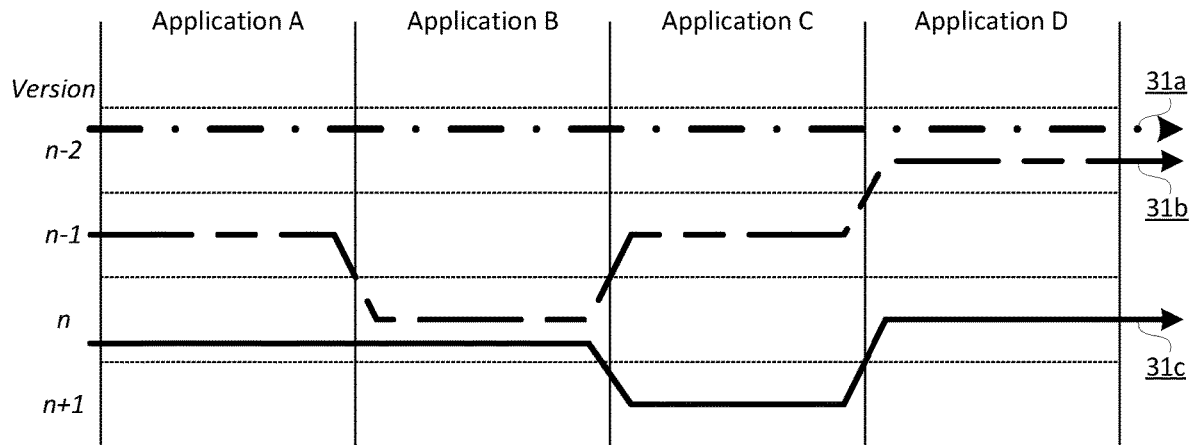
FIGS. 3A-3B illustrate exemplary software pipelines including multiple software applications, as may be used in a system for configuring deployments of sets of enterprise software applications to users, in accordance with one or more implementations.

By way of non-limiting example, FIG. 3A depicts a set 30*a* of exemplary software pipelines, such that each as depicted includes versions of four applications (labeled "Application A", "Application B", "Application C", and "Application D", which, in some implementations may correspond to first software application 135*a*, second software application 135*b*, third software application 135*c*, and fourth software application 135*d* as depicted in FIG. 1). The columns in FIG. 3A depict different applications, and the rows depict different versions of those applications. The current version may be indicated by a number "n". As depicted, a first software pipeline 31*a* includes multiple software applications, in particular versions "n−2" of Application A, Application B, Application C, and Application D.

In some implementations, first software pipeline 31a may be referred to by its components, for example as follows: A(n−2)B(n−2)C(n−2)D(n−2). In some implementations, first software pipeline 31a may collectively be referred to by some indicator and/or name (e.g., a release name). For example, first software pipeline 31a may be referred to as Software Pipeline X. Variations may be named based on the differences with Software Pipeline X. For example, a variation of Software Pipeline X in which version n−1 of Application A is used could be referred to as Software Pipeline X-A(n−1). A second software pipeline 31b may include different versions of these software applications, in particular A(n−1)B(n)C(n−1)D(n−2). In some implementations, second software pipeline 31b may collectively be referred to by some indicator and/or name (e.g., a release name). For example, second software pipeline 31b may be referred to as Software Pipeline Y. In some implementations, updated versions of Software Pipeline Y may be referred to by some indicator and/or name that references the differences with Software Pipeline Y.

In some implementations, numbers such as "n", "n−1", "n−2" may include or refer to a particular date (e.g., the release date for that version of an application and/or software pipeline). Alternatively, and/or simultaneously, version indicators of software applications may increase over time, e.g., based on one or more points of origin. For example, the particular versions used for a named software pipeline (such as Software Pipeline X) may be referred to by an indicator or number based on that name, and may serve as a point of origin in the naming scheme. For example, Software Pipeline X may be defined to include A(x)B(x)C(x)D(x). In some implementations, a variation of Software Pipeline X in which version "n−1" of Application A is used could be referred to as Software Pipeline X-A(x+1), or as Software Pipeline X-A1. A third software pipeline 31c may include different versions of these software applications, in particular A(n)B(n)C(n+1)D(n). For example, version "n+1" may refer to a beta version of an application. If the software pipeline using the current versions is referred to as Software Pipeline Z, then third software pipeline 31c may be referred to as Software Pipeline X-C1.

Figure 3B:
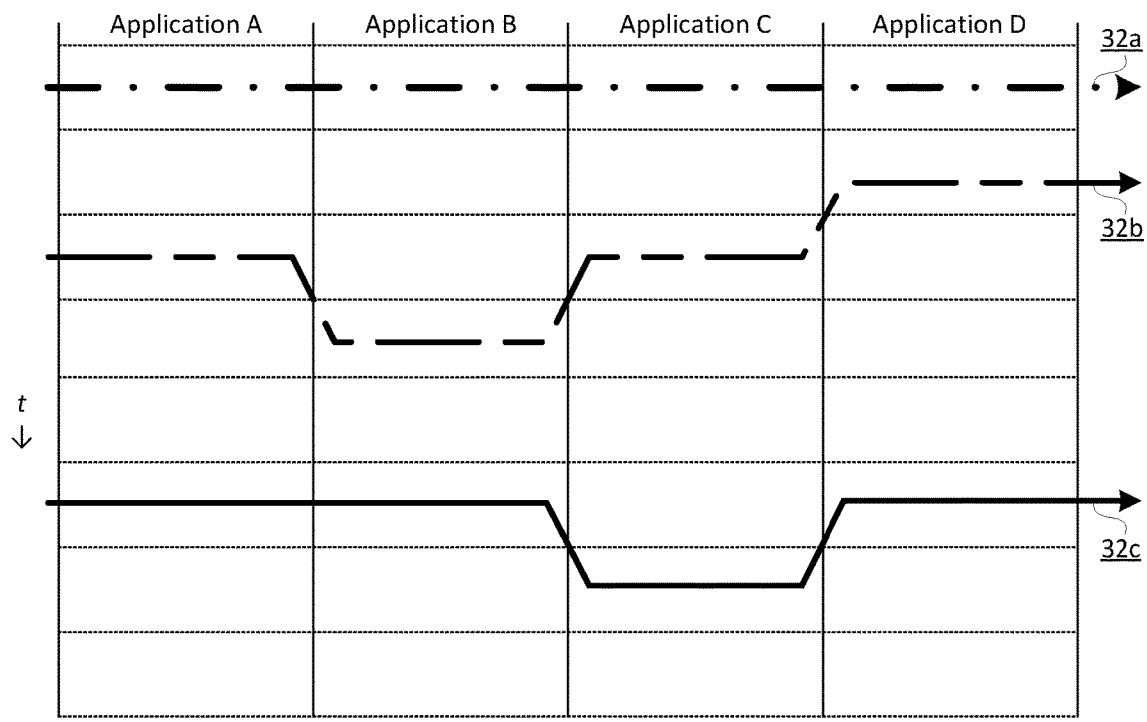

By way of non-limiting example, FIG. 3B depicts a set 30b of exemplary software pipelines, such that each as depicted includes versions of four applications (labeled "Application A", "Application B", "Application C", and "Application D"). The columns in FIG. 3B depict different applications, and the rows depict different versions of those applications, such that newer versions are placed below older versions. In other words, time progresses as indicated on the left side of FIG. 3B, and the version of Application A used in a first software pipeline 32a is older than the version of Application A used in a second software pipeline 32b, which is older than the version of Application A used in a third software pipeline 32c. The naming convention for versions of Application A can use one or more of release dates, incremental numbers, major release names, and/or other (alphanumerical) names. As depicted in FIG. 3B, the naming convention for versions of Application A may be independent of (or even unrelated to) the naming conventions for versions of Application B, Application C, and/or Application D. For example, development of these software applications may be independent (e.g., by different corporate entities). In some implementations, software pipelines may use a naming convention as well, and this naming convention may be independent of the naming convention for individual software applications. For example, first software pipeline 32a may be named "Rosebud", second software pipeline 32b may be named "Nairobi", and third software pipeline 32c may be named "Dragon". In some implementations, variations of these software pipelines may be named based on the difference with a named software pipeline.

In some implementations, server(s) 102, deployment servers 134, client computing platform(s) 104, and/or external resources 132 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users and system 100 and/or between users and client computing platforms 104. For example, user interfaces 128 may provide an interface through which users may provide information to and/or receive information from system 100. For example, administrative user interface 128a may be configured to receive user input from an administrative user. Administrative user interface 128a may enable, through the received user input, the administrative user to perform particular actions. By way of non-limiting example, the particular actions may include selecting and/or entering one or more user-provided deployment-specific configuration settings and one or more corresponding user-provided setting values. As used herein, the term "user-provided" may refer to information provided and/or confirmed by a user, including but not limited to an administrative user. Alternatively, and/or simultaneously, the particular actions may include confirming a user-initiated modification of a particular deployment of set of software applications 135 on particular deployment server 134. For example, the user-initiated modification may be in accordance with one or more user-provided deployment-specific configuration settings and one or more corresponding user-provided setting values, e.g., as entered and/or selected through administrative user interface 128a. Additionally, in some implementations, the particular actions may include confirming an additional modification of a particular deployment of set of software applications 135 on particular deployment server 134. For example, the additional modification may be based on a system-initiated modification database. For example, the additional modification may modify individual ones of a set of deployment-specific configuration settings (e.g., that match individual ones of the one or more system-initiated deployment-specific configuration settings) to individual setting values (e.g., one or more corresponding system-initiated setting values). In some implementations, an additional modification may be implemented as a modification database that can be used by modification component 114 to modify a particular deployment.

In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 132 may include sources of information outside of system 100, external entities participating with system 100, and/or other resources. In some implementations, external resources 132 may include a provider of modification databases system 100 and/or its components may operate on. In some implementations, external resources 132 may include a provider of documents, including but not limited to electronic source documents on which system 100 and/or its components may operate. In some implementations, some or all of the functionality attributed herein to external resources 132 may be provided by resources included in system 100.

Server(s) 102 may include electronic storage 130, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, and/or 120, and/or other components. Processor(s) 124 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 124 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 124 may be configured to execute one or more additional components that may perform some or all of the functionality attributed below to one of components 108, 110, 112, 114, 116, 118, and/or 120.

Figure 2:
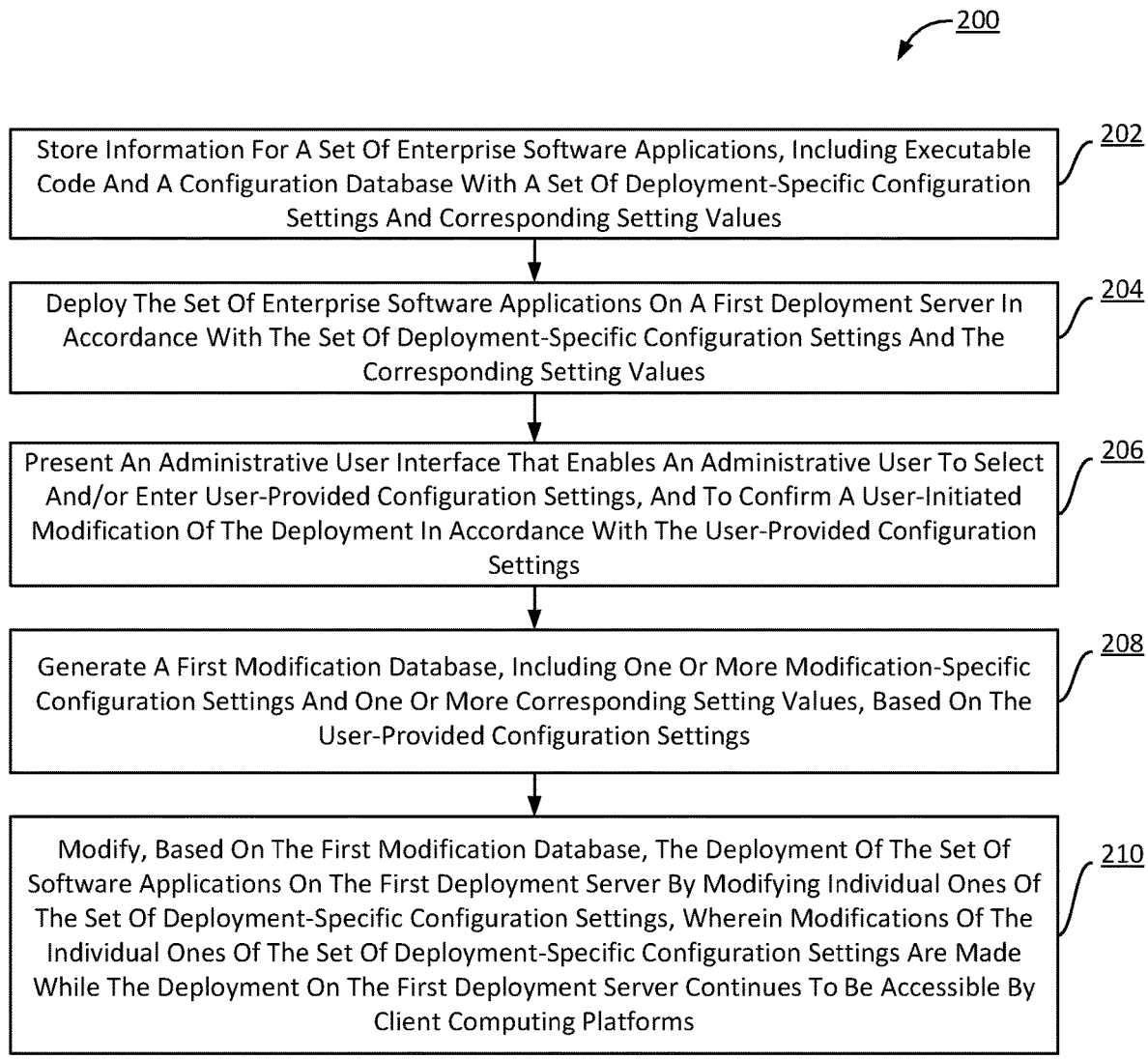
FIG. 2 illustrates a method of configuring deployments of sets of enterprise software applications to users, in accordance with one or more implementations.

FIG. 2 illustrates a method 200 of configuring deployments of sets of enterprise software applications to users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information for the set of enterprise software applications is stored in electronic storage. The set of enterprise software applications includes at least a first software application, a second software application, and a third software application. The information includes (i)

executable code of the set of enterprise software applications, and (ii) a configuration database that includes a set of deployment-specific configuration settings and corresponding setting values that define a deployment on a first deployment server of the set of enterprise software applications. The set of deployment-specific configuration settings include one or more of (a) connection parameters to control connections between the configuration database and the set of enterprise software applications, (b) environment variables, and (c) resource parameters to control available computational resources and available storage resources. In some embodiments, operation 202 is performed by a storage component the same as or similar to storage component 108 (shown in FIG. 1 and described herein).

At an operation 204, the deployment of the set of enterprise software applications is effectuated on the first deployment server in accordance with the set of deployment-specific configuration settings and the corresponding setting values. Subsequent to the deployment, the first deployment server is accessible by the client computing platforms associated with the users. The first deployment server is configured, subsequent to the deployment, such that to the client computing platforms execute the set of enterprise software applications through the first deployment server. In some embodiments, operation 204 is performed by a deployment component the same as or similar to deployment component 110 (shown in FIG. 1 and described herein).

At an operation 206, an administrative user interface is presented to an administrative user. The administrative user interface enables the administrative user to select and/or enter one or more user-provided deployment-specific configuration settings and one or more corresponding user-provided setting values. The administrative user interface enables the administrative user to confirm a user-initiated modification of the deployment of the set of software applications on the first deployment server in accordance with the one or more user-provided deployment-specific configuration settings and the one or more corresponding user-provided setting values as entered and/or selected through the administrative user interface. In some embodiments, operation 206 is performed by a presentation component the same as or similar to presentation component 120 (shown in FIG. 1 and described herein).

At an operation 208, a first modification database is generated. The first modification database includes one or more modification-specific configuration settings and one or more corresponding setting values, based on the one or more user-provided deployment-specific configuration settings and one or more corresponding user-provided setting values. In some embodiments, operation 208 is performed by a patch component the same as or similar to patch component 112 (shown in FIG. 1 and described herein).

At an operation 210, the deployment of the set of software applications on the first deployment server is modified, based on the first modification database, by modifying individual ones of the set of deployment-specific configuration settings that match individual ones of the one or more modification-specific settings to individual ones of the one or more corresponding setting values. Modifications of the individual ones of the set of deployment-specific configuration settings are made while the deployment on the first deployment server continues to be accessible by the client computing platforms. In some embodiments, operation 210 is performed by a modification component the same as or similar to modification component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for configuring deployments of sets of enterprise software applications to users, wherein a set of enterprise software applications is configured to be executed on client computing platforms that are associated with the users, wherein the users include an administrative user, the system comprising:

electronic storage configured to store information for the set of enterprise software applications, the set of enterprise software applications including at least a first software application and a second software application, wherein the information includes:
  (i) executable code of the set of enterprise software applications, and
  (ii) a configuration database that includes a set of deployment-specific configuration settings and corresponding deployment-specific configuration setting values that define a deployment on a deployment server of the set of enterprise software applications, wherein the set of deployment-specific configuration settings include one or more of:
    (a) connection parameters to control connections between the configuration database and the set of enterprise software applications,
    (b) environment variables,
    (c) resource parameters to control available computational resources and available storage resources, and
    (d) one or more infrastructure parameters that control one or more of a filesystem, one or more databases, and a cluster of the deployment server; and one or more hardware processors configured by machine-readable instructions to:
  effectuate the deployment of the set of enterprise software applications on the deployment server in accordance with the set of deployment-specific configuration settings and the corresponding deployment-specific configuration setting values, wherein, subsequent to the deployment, the deployment server is accessible by the client computing platforms associated with the users;
  effectuate a presentation, on a client computing platform associated with the administrative user, of an administrative user interface to the administrative user, wherein the administrative user interface is configured to receive user input from the administrative user, wherein the administrative user interface enables, through the received user input, the administrative user to:
    (i) select and/or enter one or more user-provided deployment-specific configuration settings and one or more corresponding user-provided setting values, and
    (ii) initiate a user-initiated modification of the deployment of the set of software applications on the deployment server in accordance with the one or more user-provided deployment-specific configuration settings and the one or more corresponding user-provided setting values as entered and/or selected through the administrative user interface;

generate a first modification database, wherein the first modification database includes one or more modification-specific configuration settings and one or more corresponding modification-specific setting values based on the received user input; and modify, based on the first modification database, the deployment of the set of software applications on the deployment server by modifying individual ones of the set of deployment-specific configuration setting values, wherein modifications of the individual ones of the set of deployment-specific configuration setting values are made while the deployment on the deployment server continues to be accessible by the client computing platforms.

2. The system of claim 1, wherein the modifications of the individual ones of the set of deployment-specific configuration setting values are based on one or more matching modification-specific configuration settings.

3. The system of claim 1, wherein the one or more hardware processors are further configured by machine-readable instructions to:

monitor and quantify operations of the deployment on the deployment server of the set of enterprise software applications, wherein the operations include one or more of:
  (a) a first type of operations controlled by the connection parameters that control the connections between the configuration database and the set of enterprise software applications,
  (b) a second type of operations controlled by the environment variables, and
  (c) a third type of operations controlled by the resource parameters that control the available computational resources and the available storage resources; and assess whether a particular monitored and quantified operation from the monitored and quantified operations indicates that a particular modification of the deployment of the set of software applications on the deployment server is likely to improve the particular monitored and quantified operation.

4. The system of claim 3, wherein the one or more hardware processors are further configured by machine-readable instructions to:

notify the administrative user, through the administrative user interface, regarding the particular modification of the deployment of the set of software applications on the deployment server that is likely to improve the particular monitored and quantified operation.

5. The system of claim 3, wherein the one or more hardware processors are further configured by machine-readable instructions to:

generate a system-initiated modification database that includes one or more system-initiated deployment-specific configuration settings and one or more corresponding system-initiated setting values, wherein the system-initiated modification database is based on the particular modification of the deployment of the set of software applications on the deployment server that is likely to improve the particular monitored and quantified operation;

wherein the administrative user interface further enables, through additional user input, the administrative user to:
  initiate an additional modification, based on the system-initiated modification database, of the deployment of the set of software applications on the deployment server by modifying individual ones of the set of deployment-specific configuration settings that match individual ones of the one or more system-initiated deployment-specific configuration settings to individual ones of the one or more corresponding system-initiated setting values; and wherein the one or more hardware processors are further configured by machine-readable instructions to:
  modify the deployment of the set of software applications on the deployment server in accordance with the additional modification.

6. The system of claim 1, wherein the modifications of the individual ones of the set of deployment-specific configuration settings are made without restarting, resetting, or rebooting the deployment server.

7. The system of claim 1, wherein the modifications of the individual ones of the set of deployment-specific configuration settings are made without redeploying the set of enterprise software applications on the deployment server.

8. The system of claim 1, wherein individual ones of the set of enterprise software applications are configured to be used interactively by the users through the client computing platforms during execution of the individual ones of the set of enterprise software applications.

9. The system of claim 8, wherein an individual one of the client computing platforms is associated with an individual user, wherein the individual one of the client computing platforms includes an individual user interface configured to receive user input from the individual user during interactive use by the individual user.

10. The system of claim 1, wherein the set of deployment-specific configuration settings further includes one or more parameters that control a Kubernetes-based platform.

11. A method of configuring deployments of sets of enterprise software applications to users, wherein a set of enterprise software applications is executed on client computing platforms that are associated with the users, wherein the users include an administrative user, the method comprising:

storing information for the set of enterprise software applications, the set of enterprise software applications including at least a first software application and a second software application, wherein the information includes (i) executable code of the set of enterprise software applications, and (ii) a configuration database that includes a set of deployment-specific configuration settings and corresponding deployment-specific configuration setting values that define a deployment on a deployment server of the set of enterprise software applications, wherein the set of deployment-specific configuration settings include one or more of (a) connection parameters to control connections between the configuration database and the set of enterprise software applications, (b) environment variables, (c) resource parameters to control available computational resources and available storage resources, and (d) one or more infrastructure parameters that control one or more of a filesystem, one or more databases, and a cluster of the deployment server;

effectuating the deployment of the set of enterprise software applications on the deployment server in accordance with the set of deployment-specific configuration settings and the corresponding deployment-specific configuration setting values, wherein, subsequent to the deployment, the deployment server is accessible by the client computing platforms associated with the users;

effectuating a presentation, on a client computing platform associated with the administrative user, of an administrative user interface to the administrative user, wherein the administrative user interface is configured to receive user input from the administrative user, wherein the administrative user interface enables, through the received user input, the administrative user to:
(i) select and/or enter one or more user-provided deployment-specific configuration settings and one or more corresponding user-provided setting values, and
(ii) initiate a user-initiated modification of the deployment of the set of software applications on the deployment server in accordance with the one or more user-provided deployment-specific configuration settings and the one or more corresponding user-provided setting values as entered and/or selected through the administrative user interface;

generating a first modification database, wherein the first modification database includes one or more modification-specific configuration settings and one or more corresponding modification-specific setting values based on the received user input; and modifying, based on the first modification database, the deployment of the set of software applications on the deployment server by modifying individual ones of the set of deployment-specific configuration setting values, wherein modifications of the individual ones of the set of deployment-specific configuration setting values are made while the deployment on the deployment server continues to be accessible by the client computing platforms.

12. The method of claim 11, wherein the modifications of the individual ones of the set of deployment-specific configuration setting values are based on one or more matching modification-specific configuration settings.

13. The method of claim 11, further comprising:
monitoring and quantifying operations of the deployment on the deployment server of the set of enterprise software applications, wherein the operations include one or more of:
(a) a first type of operations controlled by the connection parameters that control the connections between the configuration database and the set of enterprise software applications,
(b) a second type of operations controlled by the environment variables, and
(c) a third type of operations controlled by the resource parameters that control the available computational resources and the available storage resources; and assessing whether a particular monitored and quantified operation from the monitored and quantified operations indicates that a particular modification of the deployment of the set of software applications on the deployment server is likely to improve the particular monitored and quantified operation.

14. The method of claim 13, further comprising:
notifying the administrative user, through the administrative user interface, regarding the particular modification of the deployment of the set of software applications on the deployment server that is likely to improve the particular monitored and quantified operation.

15. The method of claim 13, further comprising:
generating a system-initiated modification database that includes one or more system-initiated deployment-specific configuration settings and one or more corresponding system-initiated setting values, wherein the system-initiated modification database is based on the particular modification of the deployment of the set of software applications on the deployment server that is likely to improve the particular monitored and quantified operation;
wherein the administrative user interface further enables, through additional user input, the administrative user to:
(iii) initiate an additional modification, based on the system-initiated modification database, of the deployment of the set of software applications on the deployment server by modifying individual ones of the set of deployment-specific configuration settings that match individual ones of the one or more system-initiated deployment-specific configuration settings to individual ones of the one or more corresponding system-initiated setting values;
the method further comprising:
modifying the deployment of the set of software applications on the deployment server in accordance with the additional modification.

16. The method of claim 11, wherein the modifications of the individual ones of the set of deployment-specific configuration settings are made without restarting, resetting, or rebooting the first deployment server.

17. The method of claim 11, wherein the modifications of the individual ones of the set of deployment-specific configuration settings are made without redeploying the set of enterprise software applications on the deployment server.

18. The method of claim 11, wherein individual ones of the set of enterprise software applications used interactively by the users through the client computing platforms during execution of the individual ones of the set of enterprise software applications.

19. The method of claim 18, wherein an individual one of the client computing platforms is associated with an individual user, wherein the individual one of the client computing platforms includes an individual user interface that receives user input from the individual user during interactive use by the individual user.

20. The method of claim 11, wherein the set of deployment-specific configuration settings further includes one or more parameters that control a Kubernetes-based platform.

* * * * *

UNITED STATES PATENT AND TRADEMARK OFFICE
CERTIFICATE OF CORRECTION

| | | |
|---|---|---|
| PATENT NO. | : 11,714,623 B2 | |
| APPLICATION NO. | : 17/514756 | |
| DATED | : August 1, 2023 | |
| INVENTOR(S) | : Kunal Gosar et al. | |

It is certified that error appears in the above-identified patent and that said Letters Patent is hereby corrected as shown below:

In the Claims

In Claim 16, Column 22, Line 39, please replace "rebooting the first deployment" with --rebooting the deployment--, therefor.

Signed and Sealed this
Tenth Day of October, 2023

Katherine Kelly Vidal
*Director of the United States Patent and Trademark Office*